US010635381B2

(12) United States Patent
Nakano

(10) Patent No.: US 10,635,381 B2
(45) Date of Patent: Apr. 28, 2020

(54) MULTI-DISPLAY SYSTEM, VIDEO DISPLAY DEVICE, AND PULL-OUT MECHANISM

(71) Applicant: MITSUBISHI ELECTRIC CORPORATION, Tokyo (JP)

(72) Inventor: Yuzo Nakano, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/492,925

(22) PCT Filed: May 10, 2017

(86) PCT No.: PCT/JP2017/017642
§ 371 (c)(1),
(2) Date: Sep. 10, 2019

(87) PCT Pub. No.: WO2018/207273
PCT Pub. Date: Nov. 15, 2018

(65) Prior Publication Data
US 2020/0057594 A1    Feb. 20, 2020

(51) Int. Cl.
*G06F 1/16* (2006.01)
*H05K 5/00* (2006.01)
(Continued)

(52) U.S. Cl.
CPC ............... *G06F 3/147* (2013.01); *G09F 9/33* (2013.01); *G09F 9/40* (2013.01); *G07F 17/3202* (2013.01); *H04N 5/64* (2013.01)

(58) Field of Classification Search
CPC ...... G06F 1/1601; G06F 1/1647; G06F 3/147; G06F 3/1446; G06F 3/1423; G09F 9/3026; G09F 7/20
(Continued)

(56) References Cited

U.S. PATENT DOCUMENTS 6,594,078 B2 * 7/2003 Clifton ............... G03B 21/10
                                                    348/383
8,313,072 B2 * 11/2012 Bakkom ............... E05D 3/12
                                                    248/282.1
(Continued)

FOREIGN PATENT DOCUMENTS

CN    101937630 A    1/2011
CN    203644333 U    6/2014
(Continued)

OTHER PUBLICATIONS

International Search Report for PCT/JP2017/017642 (PCT/ISA/210) dated Aug. 1, 2017.

*Primary Examiner* — Anthony M Haughton
(74) *Attorney, Agent, or Firm* — Birch, Stewart, Kolasch & Birch, LLP

(57) ABSTRACT

An object is to provide a technique that enables making an adjustment from a direction where a video display surface is located, in order to provide inconspicuous seams between one of video display devices and other adjacent video display devices even when there are no workable spaces behind the video display devices. A multi-display system includes a plurality of LED display tiles, a position adjusting mechanism, and a pull-out mechanism. The position adjusting mechanism includes a lock mechanism that switches between a locking state and an unlocking state. When the lock mechanism is in the locking state, each of the LED display tiles is fastened in a retraction position. When the lock mechanism is in the unlocking state, each of the LED display tiles is movable between the retraction position and a pull-out position by the pull-out mechanism while being floated and supported via an elastic support portion.

8 Claims, 10 Drawing Sheets

(51) Int. Cl.
  *H05K 7/00* (2006.01)
  *G06F 3/147* (2006.01)
  *G09F 9/40* (2006.01)
  *G09F 9/33* (2006.01)
  *H04N 5/64* (2006.01)
  *G07F 17/32* (2006.01)

(58) Field of Classification Search
  USPC .................. 361/679.04; 345/1.1, 1.3, 33, 55;
         248/917, 919, 920, 921, 922, 923
  See application file for complete search history.

(56) References Cited

U.S. PATENT DOCUMENTS

| | | | |
|---|---|---|---|
| 8,384,616 B2 | 2/2013 | Elliott et al. | |
| 8,451,594 B2* | 5/2013 | Kim | G09F 9/3026 361/679.04 |
| 8,833,713 B2* | 9/2014 | Kitaguchi | F16M 11/048 248/224.8 |
| 2006/0238967 A1* | 10/2006 | Carson | B60R 11/0235 361/679.04 |
| 2007/0170325 A1* | 7/2007 | Ryu | F16M 11/08 248/276.1 |
| 2009/0065667 A1* | 3/2009 | Bakkom | E05D 3/12 248/205.1 |
| 2011/0002129 A1* | 1/2011 | Zheng | G09F 9/33 362/375 |
| 2011/0101185 A1 | 5/2011 | Kitaguchi | |
| 2011/0228504 A1 | 9/2011 | Mitsuhashi | |
| 2014/0239139 A1* | 8/2014 | Opsomer | G09F 9/33 248/329 |
| 2014/0247612 A1* | 9/2014 | Hochman | F21V 21/26 362/427 |
| 2016/0210886 A1* | 7/2016 | Brashnyk | H01F 7/0252 |
| 2018/0130389 A1 | 5/2018 | Shibata et al. | |

FOREIGN PATENT DOCUMENTS

| | | |
|---|---|---|
| JP | 8-220999 A | 8/1996 |
| JP | 2002-251148 A | 9/2002 |
| JP | 2002-354377 A | 12/2002 |
| JP | 2004-317862 A | 11/2004 |
| JP | 2011-75757 | 4/2011 |
| JP | 2016-218201 A | 12/2016 |
| WO | WO 2010/079588 A1 | 7/2010 |

* cited by examiner

MULTI-DISPLAY SYSTEM, VIDEO DISPLAY DEVICE, AND PULL-OUT MECHANISM

TECHNICAL FIELD

The present invention relates to a multi-display system for displaying video information onto a large screen consisting of a plurality of video display devices arranged in up-and-down and side-to-side directions. The present invention also relates to such a video display device and a pull-out mechanism.

BACKGROUND ART

Technical development and cost reduction in display elements allow display tiles each composed of multiple display elements (e.g., LEDs) to be frequently used for outdoor and indoor advertising display and other purposes. A display device that includes display panels has been mainly used for displaying nature images and animation moving images, and for other purposes. For indoor uses, since visibility distance gets smaller as pixel pitch gets smaller, display devices provided with such display tiles have been recently used to display images on personal computers at conference rooms and on personal monitoring computers as well. For monitoring uses in particular, personal-computer images that are almost static images have been displayed frequently.

The mainstream of display devices provided with display panels is surface-mount-device (SMD) display devices. Such an SMD display device includes a resin-sealed, small LED display module consisting of LED display elements contained in a cavity molded with ceramic, resin, or other materials. An SMD display device has been used as a large video display device with a pixel pitch of 3 mm or more.

In recent years, however, cost reduction in the LED display elements and achievement in high definition encourage the market to introduce a large video display device in which multiple LED display devices each composed of components densely mounted at a pixel pitch of, for instance, 1 to 2 mm are arranged in the form of tiles.

For instance, Patent Documents 1 and 2 disclose components of an LED display and how to hold these components.

A large video display device in Patent Document 1 is formed of a multi-display system that includes multiple LED display tiles. LED display elements of R, G, and B are mounted on small LED display module substrates so as to extend near the periphery portions of the module substrates. The multiple LED display module substrates, which are arranged in square array to constitute a first LED display panel, are assembled in a support structure. A second LED display tile, similarly to the first LED display tile, is also assembled in the support structure. The first and second LED display tiles are assembled in the support structure while being in substantially close contact with each other with an extremely small gap therebetween. This extremely small gap needs to be of the same size as the pixel pitch.

Patent Documents 1 and 2 describe that the side surfaces of the LED display tiles are processed into a planar shape. These multiple LED display tiles, when combined to each other to form a large-screen video display device in a multi-display system, are coupled to each other in such a manner that the side surfaces of one of the LED display tiles are brought into substantially close contact with the side surfaces of other adjacent LED display tiles.

Patent Document 3 discloses a structure formed of LED display tiles coupled to each other with hook-shaped couplers.

PRIOR ART DOCUMENTS

Patent Documents

Patent Document 1: U.S. Pat. No. 8,384,616
Patent Document 2: Chinese Patent Application Publication No. 101937630
Patent Document 3: Chinese Utility Model Publication Patent No. 203644333

SUMMARY

Problem to be Solved by the Invention

The gaps between one of the LED display panels and other adjacent LED display panels in up-and-down and side-to-side directions, and the steps between the adjacent LED display surfaces in a back-and-forth direction need to be as small as the pixel pitch to be rendered inconspicuous. In addition, the position of the video display device needs to be adjusted in such a manner that the gaps and steps are rendered inconspicuous when viewed from a direction where its video display surface is located, because there are no sufficient workable spaces behind the video display device.

In Patent Document 1, the LED display tiles are each supported by an attachment structure so that their arrangement remains aligned. This attachment structure is provided in such a manner that the gaps between one of the LED display tiles and other LED display panels adjacent to the LED display tile in up-and-down and side-to-side directions are of the same size as the pixel pitch. Unfortunately, since the side surfaces of each LED display tile is processed to be flat, the gaps between one of the LED display tiles and other adjacent LED display tiles vary due to mechanical precision, such as size tolerances in the support structure, which holds the LED display tiles, and degrees of flatness.

In Patent Document 2, the LED display module substrate is attached to an LED base. The LED base includes a housing frame and joining members attached to its back surface. Each LED display tile formed of these members has side surfaces of substantially planer shape. For an arrangement of the LED display tiles in up-and-down and side-to-side directions, the structure in Patent Document 2 produces variations in the gaps between one of the LED display tiles and other adjacent LED display tiles, as is the case with the structure in Patent Document 1.

The structure in Patent Document 3, which describes the use of the hook-shaped couplers for the coupling between the LED display tiles, requires highly accurate position adjustment when the LED display tiles are coupled to each other in a side-to-side direction. For this reason, position adjustment between the LED display tiles takes a considerable amount of time.

In these structures in Patent Documents 1 to 3, variation in the processing size of components in a metal housing that constitute each LED display tile, warpage in the LED display module substrate, or other factors generates gaps between one of the LED display tiles and other adjacent LED display tiles, and steps between the LED display surfaces in their back-and-forth direction. Such gaps and steps are seen as coupled portions, i.e., seams between one of the LED display tiles and other adjacent LED display tiles, depending on changes in luminance or directivity. This causes degradation in the quality of a video image.

It is an object of the present invention to provide a technique that enables making an adjustment from a direction where a video display surface is located, in order to provide inconspicuous seams between one of video display devices and other adjacent video display devices even when there are no workable spaces behind the video display devices.

Means to Solve the Problem

A multi-display system according to the present invention includes the following: a plurality of video display devices; a support structure that supports the plurality of video display devices; a position adjusting mechanism disposed in the support structure and capable of adjusting the position of each of the plurality of video display devices; and a pull-out mechanism disposed between the plurality of video display devices and the support structure, and capable of moving each of the plurality of video display devices between a retraction position and a pull-out position. The retraction position is a position for fastening each of the plurality of video display devices and the support structure to each other. The pull-out position is a position anterior to the retraction position. The position adjusting mechanism includes a lock mechanism that switches between a locking state and an unlocking state. The locking state is a state for fastening each of the plurality of video display devices and the support structure to each other. The unlocking state is a state for releasing the fastening between each of the plurality of video display devices and the support structure. When the lock mechanism is in the locking state, each of the plurality of video display devices is fastened in the retraction position, and when the lock mechanism is in the unlocking state, each of the plurality of video display devices is movable between the retraction position and the pull-out position by the pull-out mechanism while being floated and supported via an elastic support portion. The position adjusting mechanism further includes a seam adjusting mechanism and a step adjusting mechanism. The seam adjusting mechanism adjusts the position of each of the plurality of video display devices in side-to-side and up-and-down directions. The step adjusting mechanism adjusts the position of each of the video display devices in a back-and-forth direction. The step adjusting mechanism includes a step adjuster, magnet, and positioning pin on the back surface of each of the plurality of video display devices. The magnet is disposed inside the step adjuster. The positioning pin is disposed on a center axis of the step adjuster and protrudes backward from the back surface of the step adjuster. The seam adjusting mechanism includes a housing fastened to the support structure, and a cylindrical portion disposed at the front portion of the housing. The cylindrical portion supports the positioning pin inserted in a hole portion, in a manner movable in the back-and-forth direction. A portion of the seam adjusting mechanism that abuts on the step adjuster is made of a magnetic material or magnet. When each of the plurality of video display devices is in the retraction position, the positioning pin is inserted in the cylindrical portion, so that a magnetic force causes the step adjuster to adhere to the seam adjusting mechanism, which is disposed in the support structure.

Effects of the Invention

According to the present invention, when the lock mechanism is in the locking state, each video display device is fastened in the retraction position, and when the lock mechanism is in the unlocking state, each video display device is movable between the retraction position and the pull-out position by the pull-out mechanism while being floated and supported via the elastic support portion.

Such a configuration allows a user to access the position adjusting mechanism, not only with each video display device located in the fastening position, but also with each video display device moved to the pull-out position by the pull-out mechanism. Consequently, the user can access the position adjusting mechanism from both of the direction where the video display surfaces of the video display devices are located and the direction where their back surfaces are located. This enables making an adjustment from the direction where the video display surfaces are located, in order to provide inconspicuous seams between one of the video display devices and other adjacent video display devices even when there are no workable spaces behind the video display devices.

These and other objects, features, aspects and advantages of the present invention will become more apparent from the following detailed description of the present invention when taken in conjunction with the accompanying drawings.

DESCRIPTION OF EMBODIMENT(S)

Embodiment

Figure 1:
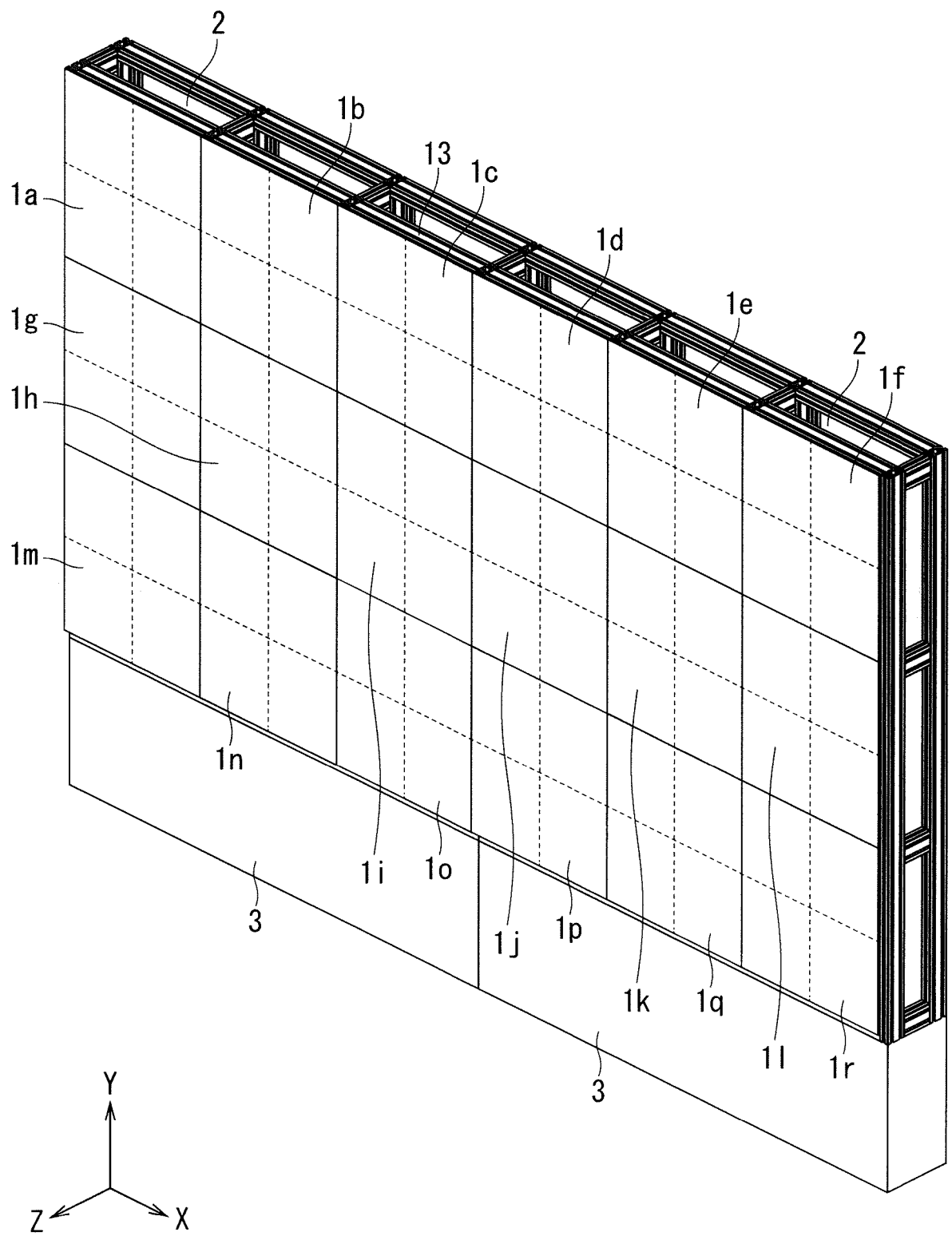
FIG. 1 is a perspective view of a multi-display system according to an embodiment.
Figure 2:
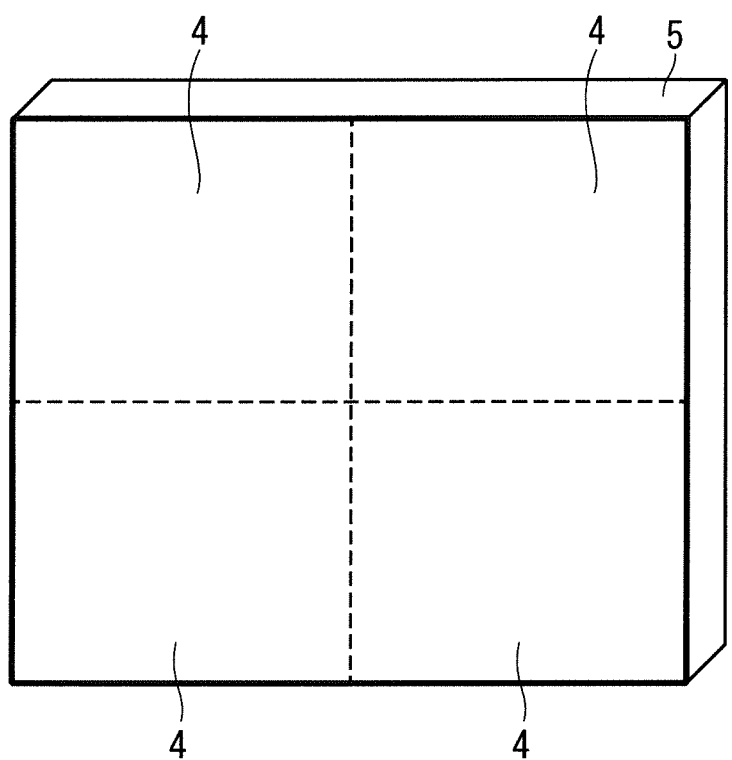
FIG. 2 is a perspective view of an LED display tile.
Figure 3:
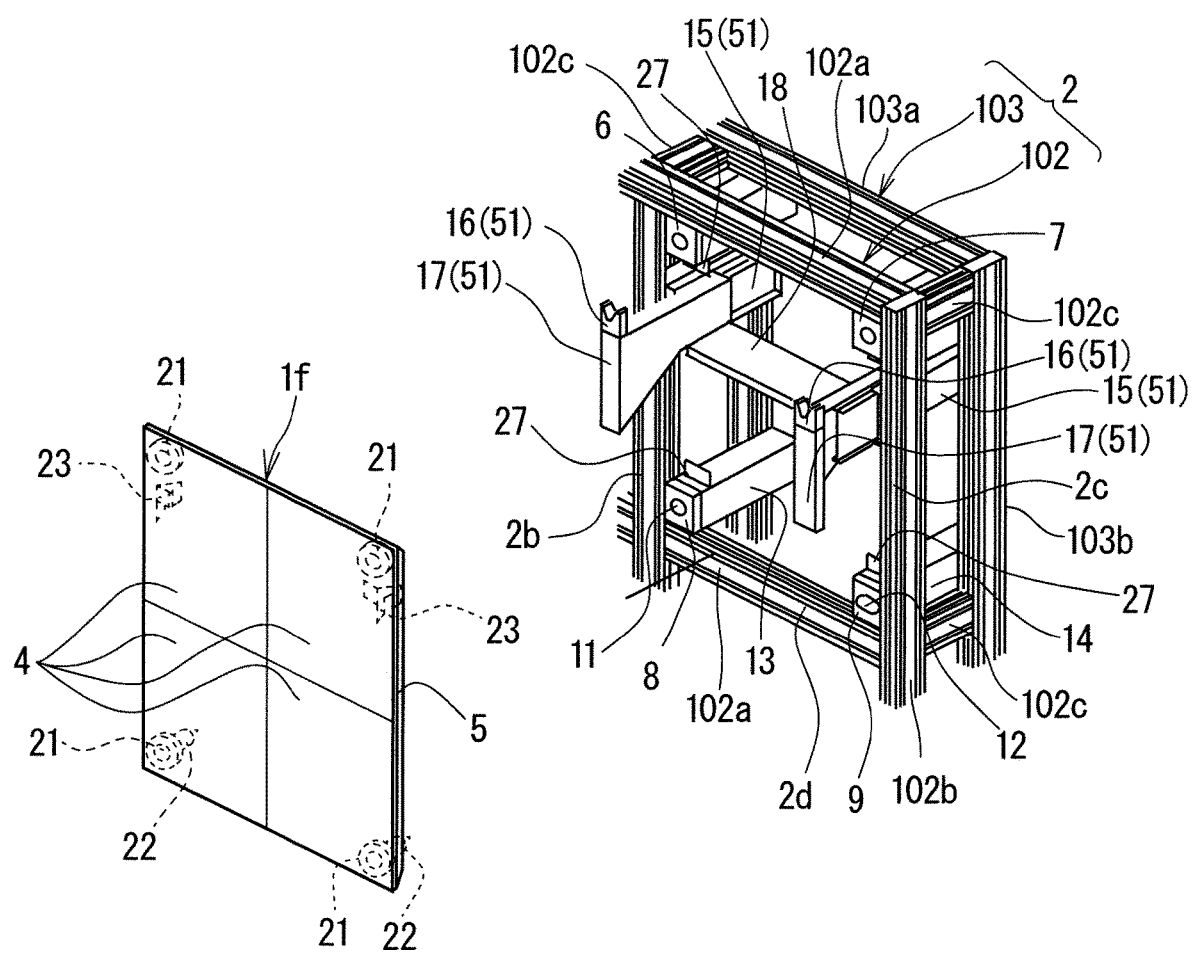
FIG. 3 is an exploded perspective view showing the LED display tile and a support structure.

The embodiment of the present invention will be described with reference to the drawings. FIG. 1 is a perspective view of a multi-display system 100 according to the embodiment. FIG. 2 is a perspective view of an LED display tile 1*f*. FIG. 3 is an exploded perspective view showing the LED display tile 1*f* and a support structure 2.

As shown in FIG. 1, the multi-display system 100 includes a plurality of LED display tiles 1*a* to 1*r*, a support structure 2, and a mount 3. The LED display tiles 1*a* to 1*r* are equal to video display devices.

Figure 9:
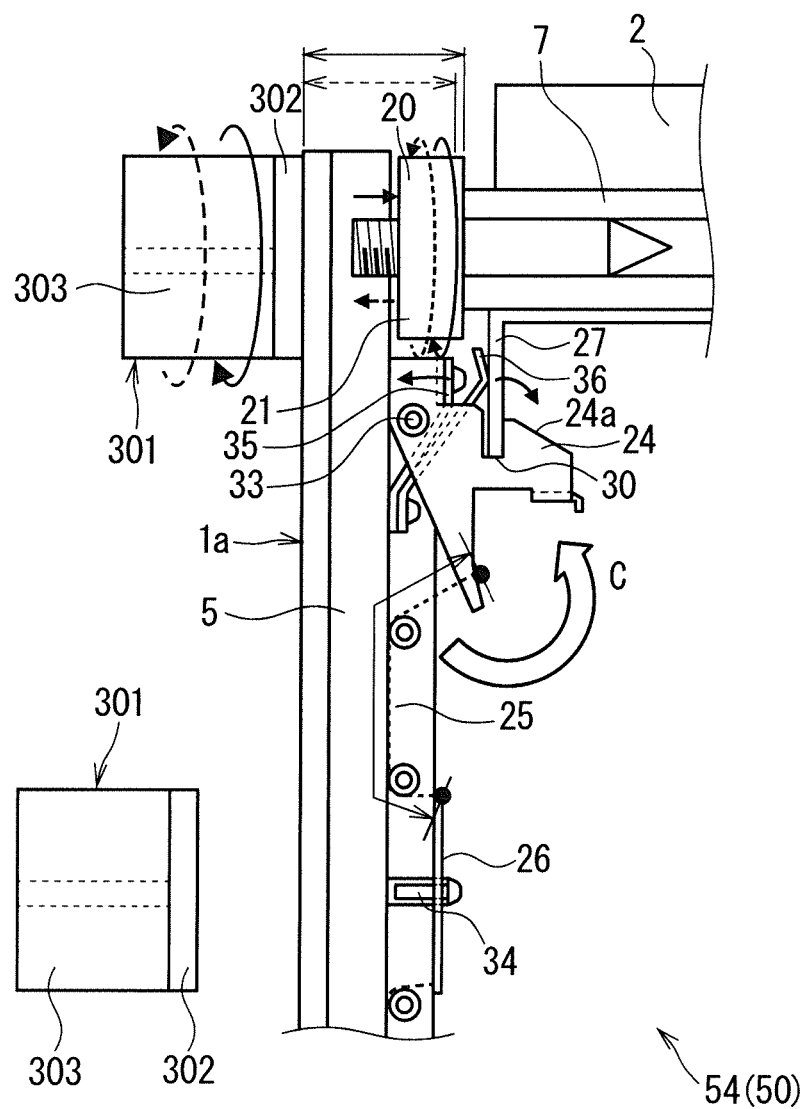
FIG. 9 is a cross-sectional view showing the fastening between the LED display tile and the support.
Figure 10:
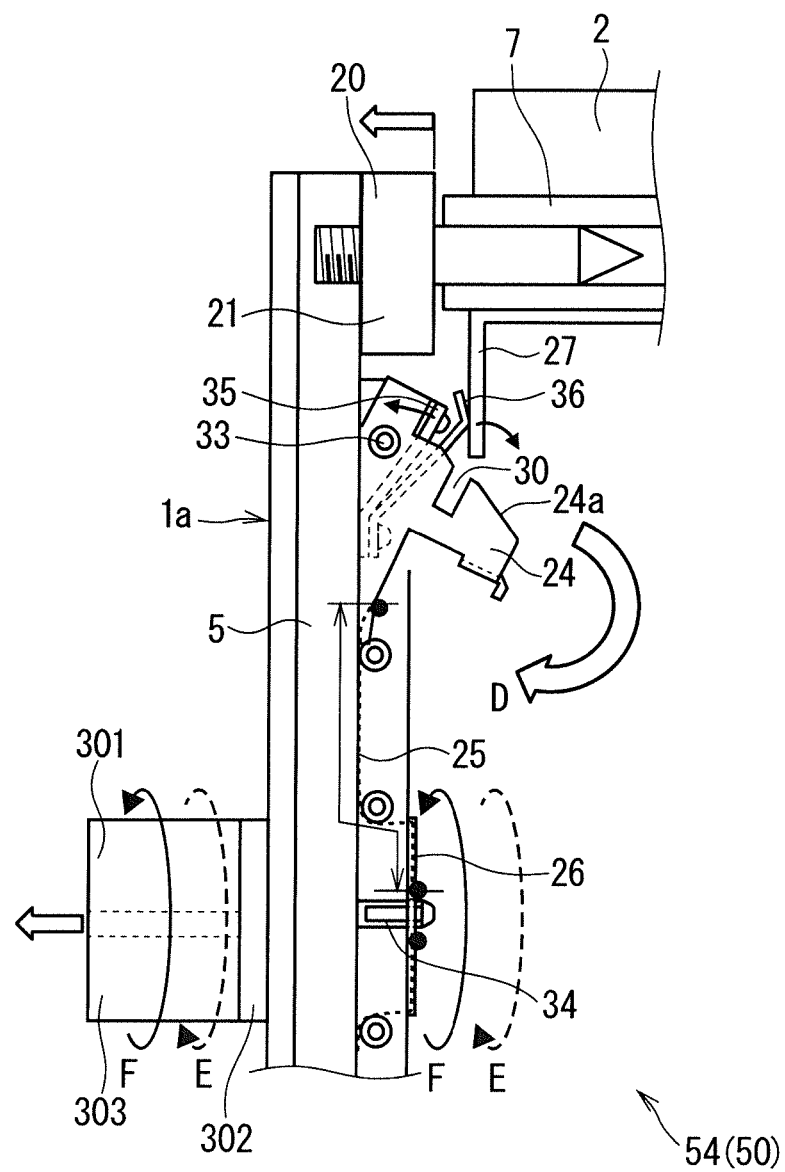
FIG. 10 is a cross-sectional view showing that the fastening between the LED display tile and the support is released.

The multi-display system 100 further includes a position adjusting mechanism 50 (c.f., FIGS. 6 and 7), a pull-out mechanism 51 (c.f., FIG. 3), and magnet jigs 301 (c.f., FIGS. 9 and 10). These components will be detailed later on.

The multi-display system 100 is configured such that the 18 LED display tiles 1a to 1r are arranged in up-and-down and side-to-side directions on the mount 3, for instance. To be specific, the LED display tiles 1a to 1r are arranged in such a manner that each column consists of three LED display tiles and each row consists of six LED display tiles. The 18 LED display tiles 1a to 1r are of the same configuration. Thus, the LED display tile 1f will be described herein.

As shown in FIG. 2, the LED display tile 1f includes four LED module substrates 4 and an LED base 5. The four LED module substrates 4 are arranged in such a manner that each column consists of two LED module substrates and that each row consists of two LED module substrates. Each of the four LED module substrates 4 has a plurality of LED display elements arranged in square array. The LED base 5 is fastened to the back surfaces of the four LED module substrates 4. The LED base 5 is made of aluminum or a magnesium alloy, which is a non-magnetic material. The position of the four LED module substrates 4 is accurately adjusted with respect to the LED base 5, and the four LED module substrates 4 are arranged and fastened in such a manner that the seams between one of the LED module substrates 4 and the other adjacent LED module substrates 4 are inconspicuous.

As shown in FIGS. 2 and 3, the support structure 2 is coupled to the back surface of the LED display tile 1f, more specifically, the back surface of the LED base 5 via corner joints 6, 7, 8, and 9, and supports the back surface of the LED display tile 1f. The support structure 2 is made of aluminum, which is a non-magnetic material. The support structure 2 has two back-surface frames 102 and 103 assembled back and forth. The back-surface frames 102 and 103 are fastened by a plurality of frames 102c extending in a back-and-forth direction. The frames 102c are disposed at locations corresponding to the four corner portions of the LED display tile 1f. The back-and-forth direction herein is Z-axis direction in FIG. 1.

Reference is made to the back-surface frame 102. As shown in FIG. 3, the back-surface frame 102 is a front frame, and includes frames 102a extending in a side-to-side direction and frames 102b extending in an up-and-down direction. Herein, the side-to-side direction is X-axis direction in FIG. 1, and the up-and-down direction is Y-axis direction in FIG. 1.

Reference is made to the back-surface frame 103. The back-surface frame 103 is a back frame, and includes frames 103a extending in the side-to-side direction and frames 103b extending in the up-and-down direction.

The LED base 5, forming the back surfaces of the LED display tiles 1a to 1r, contains an LED display drive circuit, power supply, and other components, all of which are similar to conventional components and thus will not be elaborated upon.

As shown in FIG. 3, the corner joints 6, 7, 8, and 9 are fastened to the frames 102c, coupling the back-surface frames 102 and 103, with fastening screws 10 (c.f., FIG. 6), thus firmly coupling the frames constituting the support structure 2. The frames 102a, 102b, 102c, 103a, and 103b are extruded frames of the same cross-sectional shape having different lengths from each other. The support structure 2 can be formed at low cost in combination with these multiple extruded frames.

The corner joints 6, 7, 8, and 9 are disposed at locations in the support structure 2 corresponding to the four corner portions of the LED display tile 1f. To be more specific, the corner joint 6 is disposed at a location in the support structure 2 corresponding to the upper left corner portion of the LED display tile 1f. The corner joint 7 is disposed at a location in the support structure 2 corresponding to the upper right corner portion of the LED display tile 1f. The corner joint 8 is disposed at a location in the support structure 2 corresponding to the lower left corner portion of the LED display tile 1f. The corner joint 9 is disposed at a location in the support structure 2 corresponding to the lower right corner portion of the LED display tile 1f.

In the present embodiment, at the corner joint 8 are disposed a cylindrical portion 11 and a seam adjusting mechanism 13, which is part of the position adjusting mechanism 50; in addition, at the corner joint 9 are disposed a long cylindrical portion 12 and a seam adjusting mechanism 14, which is part of the position adjusting mechanism 50. The corner joints 6, 7, 8, and 9 serve as frame coupling, also serves as members for strengthening the support structure 2, and also functions as position adjustment to the LED display tile 1f in the up-and-down and side-to-side directions. Accordingly, the number of parts and the manufacturing cost of the corner joints 6, 7, 8, and 9 are reduced. It is noted that although the seam adjusting mechanisms 13 and 14 are respectively disposed at the corner joints 8 and 9, such seam adjusting mechanisms may be disposed at the respective corner joints 6 and 7 instead of the corner joints 8 and 9.

Reference is made to the pull-out mechanism 51. As shown in FIG. 3, the pull-out mechanism 51 is disposed at the right and left of the support structure 2, and includes guide portions 15, elastic support portions 16, and movable portions 17. The guide portions 15 extend in the back-and-forth direction and are fastened below the corner joints 6 and 7 in the support structure 2. The right and left guide portions 15 are coupled to each other by a coupling portion 18. The movable portions 17 have bent portions at their front end portions, and are thus L-shaped in cross sectional view. The movable portions 17 are made from steel plates of magnetic material. The elastic support portions 16 protruding upward are disposed at the respective front end portions of the movable portions 17.

The movable portions 17 have level portions attached to respective rails disposed in the longitudinal direction of the guide portions 15. The movable portions 17 are thus movable back and forth along the rails of the guide portions 15. Accordingly, the pull-out mechanism 51 is capable of moving the LED display tile 1f between a retraction position, which is a position for fastening the LED display tile 1f and the support structure 2 to each other, and a pull-out position, which is a position anterior to the retraction position, while floating and supporting the LED display tile 1f via the elastic support portions 16.

Figure 4:
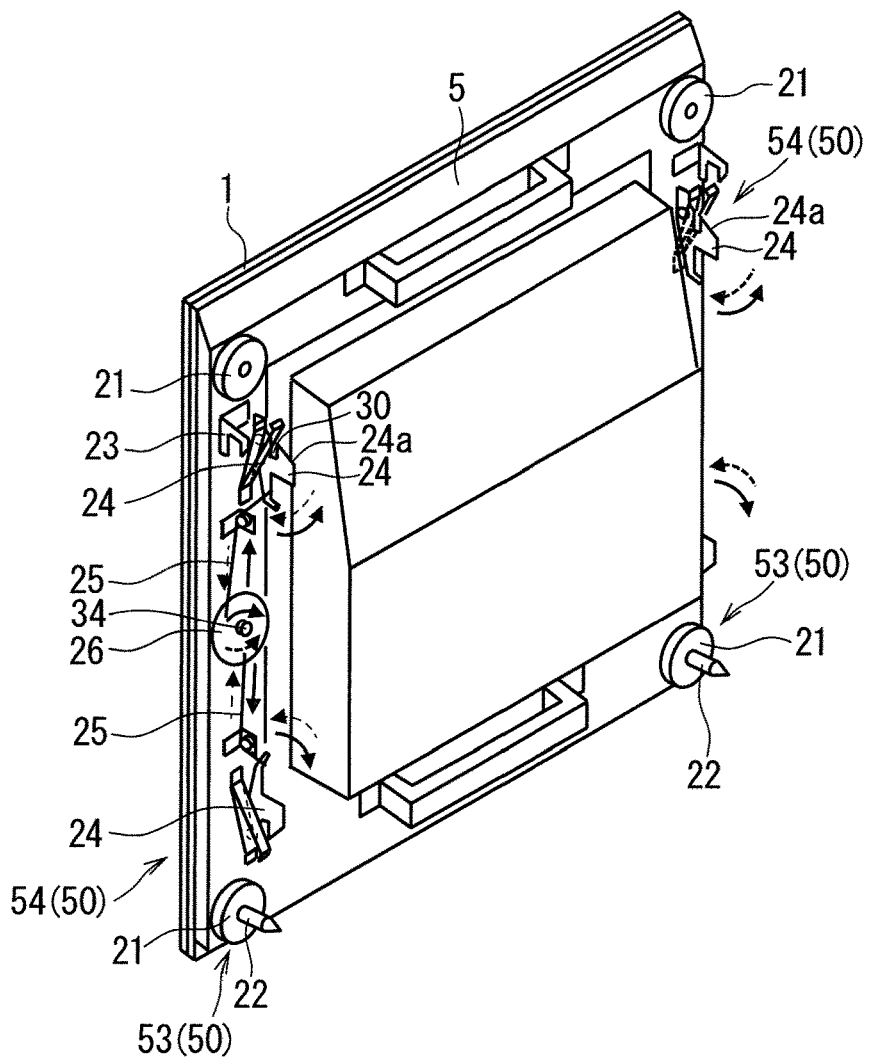
FIG. 4 is a perspective view of the back surface of the LED display tile.
Figure 5:
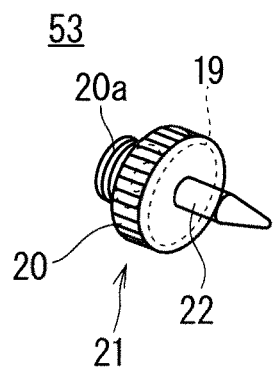
FIG. 5 is a perspective view of a step adjusting mechanism.

Reference is made to the structure of the back surfaces of the LED display tiles 1a to 1r. FIG. 4 is a perspective view of the back surface of the LED display tile 1a. FIG. 5 is a perspective view of one of step adjusting mechanisms 53. The 18 LED display tiles 1a to 1r are of the same configuration. Thus, the LED display tile 1a will be described herein.

As shown in FIG. 4, the two step adjusting mechanisms 53 are disposed at the respective two corner portions at the lower left and lower right of the back surface of the LED base 5. The step adjusting mechanisms 53 are part of the position adjusting mechanism 50. The following briefly describes the position adjusting mechanism 50.

The position adjusting mechanism 50 is capable of adjusting the position of each of the LED display tiles 1a to 1r, and includes the seam adjusting mechanisms 13 and 14, the step adjusting mechanisms 53, and lock mechanisms 54. The seam adjusting mechanisms 13 and 14 serves as position adjustment to each of the LED display tiles 1a to 1r in the side-to-side and up-and-down directions. The step adjusting mechanisms 53 serve as position adjustment to each of the LED display tiles 1a to 1r in the back-and-forth direction. The lock mechanisms 54 switch between a locking state for fastening the LED display tiles 1a to 1r and the support structure 2 to each other, and an unlocking state for releasing the fastening between each of the LED display tiles 1a to 1r and the support structure 2.

As shown in FIGS. 4 and 5, each step adjusting mechanism 53 includes a step adjuster 21, a magnet 19, and a positioning pin 22. The step adjuster 21 has a circular-plate shape and includes a handling portion 20 disposed on the circumference portion of the step adjuster 21. The handling portion 20 is provided for a user to pinch the handling portion 20 by finger to rotate the step adjuster 21. The step adjuster 21 has a front surface provided with a male screw 20a protruding forward. The step adjuster 21 has a back surface provided with the positioning pin 22. The positioning pin 22 protrudes backward from the back surface on the center axis of the step adjuster 21. The positioning pin 22 has a distal end portion having a conical shape.

The LED base 5 has four screw holes (not shown) at four respective corner portions on its back surface. The two step adjusters 21 are attached to the respective screw holes at the two, lower right and lower left corner portions in the back surface of the LED base 5. The two step adjusters 21 each incorporate the magnet 19.

Two other step adjusters 21 having no positioning pins 22 are attached to respective screw holes at the two, upper right and upper left corner portions of the back surface of the LED base 5. It is noted that the positioning pins 22, although being disposed in only the step adjusters 21 attached to the two, lower right and lower left corner portions of the back surface of the LED base 5 in FIG. 4, may be also disposed in the step adjusters 21 attached to the two, upper right and upper left corner portions of the back surface of the LED base 5.

Disposed below the respective upper right and upper left step adjusters 21 are metal hook plates 23 for hooking the LED display tile 1a to the elastic support portions 16 of the pull-out mechanism 51.

The lock mechanisms 54 on the right and left sides in a pair are disposed below the upper right and upper left step adjusters 21 and above the lower right and lower left step adjusters 21. The pair of right and left lock mechanisms 54 is of the same configuration. Thus, the right lock mechanism 54 will be described herein.

The lock mechanism 54 includes a pair of upper and lower metal retaining plates 24, which are retaining portions, and a pair of coupling wires 25, which is a pair of couplers, and a metal rotation plate 26. The pair of metal retaining plates 24 is individually disposed below the metal hook plate 23 and above the lower right step adjuster 21.

The pair of metal retaining plates 24 is retainable in a pair of reception fittings 27 (c.f., FIG. 3), which is a pair of reception portions. Each of the pair of metal retaining plates 24 has a groove 30 retainable to the reception fitting 27, and a slope portion 24a that abuts on the distal end portion of the corresponding reception fitting 27 to guide the distal end portion to the groove 30.

The metal rotation plate 26 is disposed between the pair of metal retaining plates 24. Each of the pair of coupling wires 25 has one end coupled to corresponding one of the pair of metal retaining plates 24. The metal rotation plate 26 is coupled to the other ends of the pair of coupling wires 25 and is rotatable about a rotation shaft 34.

When the pull-out mechanism 5 is retracted, the distal ends of the reception fittings 27 at the corner joints 6, 7, 8, and 9 abut on the respective slope portions 24a of the metal retaining plates 24, and move along the slope portions 24a. Accordingly, the metal retaining plates 24 are pushed against the spring force of attractive springs 35 (c.f., FIG. 9), which will be detailed later on, to turn. Furthermore, when the distal end portions of the reception fittings 27 are fitted into the respective groove portions 30, the metal retaining plates 24 and the reception fittings 27 are retained by the spring force, thus bringing the lock mechanisms 54 into the locking state.

When the lock mechanisms 54 are in the locking state, each of the LED display tiles 1a to 1r is fastened in the retraction position. When the retainment between the metal retaining plates 24 and the reception fittings 27 is released to bring the lock mechanism 54 into the unlocking state, on the other hand, the pull-out mechanism 51 enables each of the LED display tiles 1a to 1r to move between the retraction position and the pull-out position.

Figure 6:
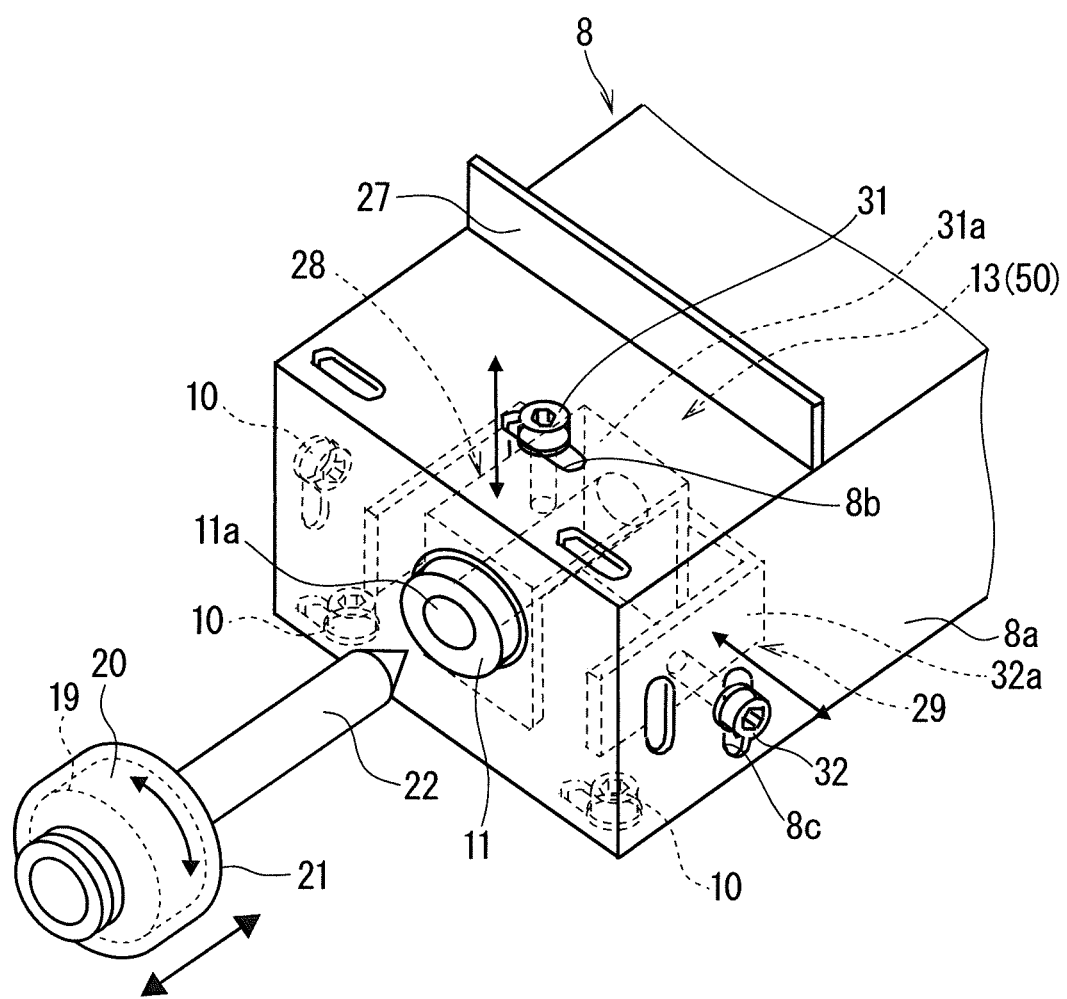
FIG. 6 is a perspective view showing a corner joint and a step adjuster.
Figure 7:
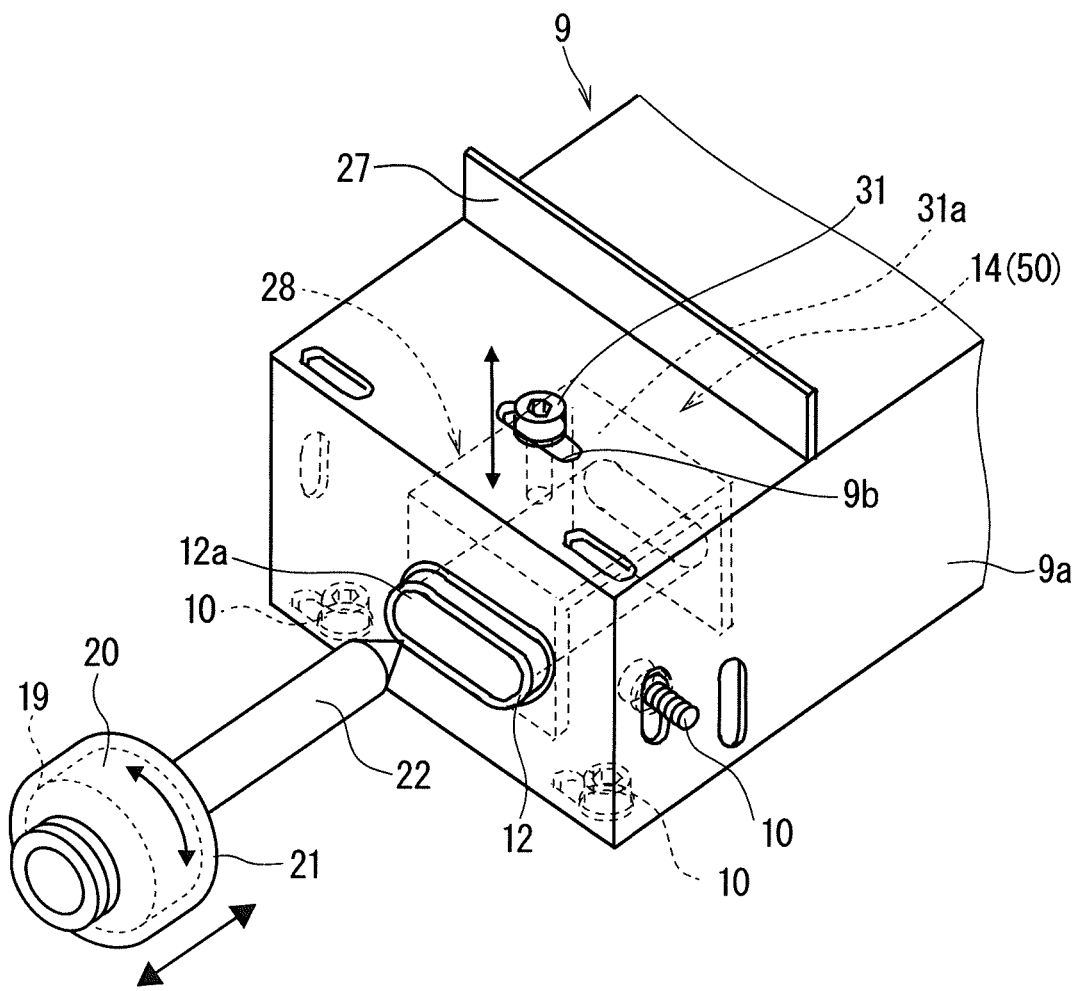
FIG. 7 is a perspective view showing a corner joint and a step adjuster.

The following describes the seam adjusting mechanisms 13 and 14, which serves as position adjustment to the LED display tiles 1a to 1r in the side-to-side and up-and-down directions. FIG. 6 is a perspective view showing the corner joint 8 and the step adjuster 21. FIG. 7 is a perspective view showing the corner joint 9 and the step adjuster 21.

As shown in FIGS. 6 and 7, the seam adjusting mechanism 13 is disposed at the corner joint 8, and includes a housing 8a, the cylindrical portion 11, an up-and-down position adjusting mechanism 28, and a side-to-side position adjusting mechanism 29. In addition, the seam adjusting mechanism 14 is disposed at the corner joint 9, and includes a housing 9a, the long cylindrical portion 12, and another up-and-down position adjusting mechanism 28. Although in FIGS. 6 and 7, the seam adjusting mechanisms 13 and 14 are different from each other in configuration, the seam adjusting mechanism 14 may also include both the up-and-down position adjusting mechanism 28 and side-to-side position adjusting mechanism 29. How to adjust the seams, which is similar to that will be described below, will not be elaborated upon here.

The seam adjusting mechanism 13 will be first described. As shown in FIGS. 3 and 6, the housing 8a is fastened to the support structure 2. As shown in FIG. 6, the up-and-down position adjusting mechanism 28 includes a metal up-and-down movement plate 31a having a cornered U-shape, and an up-and-down position adjuster 31. The metal up-and-down movement plate 31a is disposed at the front portion inside the housing 8a, and is disposed in such a manner that both end portions of its cornered U-shape are arranged back and forth while being oriented downward.

The cylindrical portion 11 is disposed at the front portion inside the housing 8a. To be more specific, the cylindrical portion 11 is fastened to the metal up-and-down movement plate 31a, with its hole portion 11a oriented back and forth. The cylindrical portion 11 supports the positioning pin 22 inserted in the hole portion 11a, in a manner movable in the back-and-forth direction.

The side-to-side position adjusting mechanism 29 is disposed at the front portion inside the housing 8a, and includes a metal side-to-side movement plate 32a having a cornered U-shape, and a side-to-side position adjuster 32. The metal side-to-side movement plate 32a is disposed with both end portions of its cornered U-shape oriented forward.

The metal up-and-down movement plate 31a and the metal side-to-side movement plate 32a are combined to be coupled to each other with a screw or other means. The housing 8a has an upper surface provided with a long hole 8b that is a through-hole extending in the side-to-side direction. The metal up-and-down movement plate 31a has an upper surface provided with a screw hole (not shown). The up-and-down position adjuster 31 has a turn shaft and a male screw disposed at the distal end portion of the turn shaft, and is screwed through the long hole 8b into the screw hole in the upper surface of the metal up-and-down movement plate 31a. Accordingly, the metal up-and-down movement plate 31a is supported by the housing 8a in a manner movable in the up-and-down direction with respect to the housing 8a.

The housing 8a has a right side surface provided with a long hole 8c that is a through-hole extending in the up-and-down direction. The metal side-to-side movement plate 32a has a right side surface provided with a screw hole (not shown). The side-to-side position adjuster 32 has a male screw disposed at the distal end portion of its turn shaft, and is screwed through the long hole 8c into the screw hole in the right side surface of the metal side-to-side movement plate 32a. Accordingly, the metal side-to-side movement plate 32a is supported by the housing 8a in a manner slidable in the side-to-side direction with respect to the housing 8a.

The operation of the seam adjusting mechanism 13 will be next described. Rotating the up-and-down position adjuster 31 of the up-and-down position adjusting mechanism 28 of the seam adjusting mechanism 13 moves the metal up-and-down movement plate 31a and the metal side-to-side movement plate 32a in the up-and-down direction with reference to the upper surface of the housing 8a. Accordingly, the cylindrical portion 11 screwed in the metal up-and-down movement plate 31a moves in the up-and-down direction, so that the up-and-down position of the positioning pin 22 inserted in the cylindrical portion 11 is adjusted.

Rotating the side-to-side position adjuster 32 of the side-to-side position adjusting mechanism 29 of the seam adjusting mechanism 13 moves the metal up-and-down movement plate 31a and the metal side-to-side movement plate 32a in the side-to-side direction with reference to the right side surface of the housing 8a of the corner joint 8. Accordingly, the cylindrical portion 11 screwed in the metal up-and-down movement plate 31a moves in the side-to-side direction, so that the side-to-side position of the positioning pin 22 inserted in the cylindrical portion 11 is adjusted.

The seam adjusting mechanism 14 will be next described. As shown in FIGS. 3 and 7, the housing 9a is fastened to the support structure 2. As shown in FIG. 7, the metal up-and-down movement plate 31a is disposed at the front portion inside the housing 9a, and is disposed in such a manner that both end portions of its cornered U-shape are arranged back and forth while being oriented downward.

The long cylindrical portion 12 is disposed at the front portion inside the housing 9a. To be more specific, the long cylindrical portion 12 is fastened to the metal up-and-down movement plate 31a with its hole portion 12a, which is a long hole extending in the side-to-side direction, oriented back and forth. The housing 9a has an upper surface provided with a long hole 9b that is a through-hole extending in the side-to-side direction. The metal up-and-down movement plate 31a has an upper surface provided with a screw hole (not shown). The long cylindrical portion 12 supports the positioning pin 22 inserted in the hole portion 12a, in a manner movable in the back-and-forth direction.

The up-and-down position adjuster 31 is screwed through the long hole 9b into the screw hole in the upper surface of the metal up-and-down movement plate 31a. Accordingly, the metal up-and-down movement plate 31a is supported by the housing 9a in a manner movable in the up-and-down direction with respect to the housing 9a.

The operation of the seam adjusting mechanism 14 will be next described. Rotating the up-and-down position adjuster 31 of the up-and-down position adjusting mechanism 28 of the seam adjusting mechanism 14 moves the metal up-and-down movement plate 31a in the up-and-down direction with reference to the upper surface of the housing 9a. Accordingly, the long cylindrical portion 12 screwed in the metal up-and-down movement plate 31a moves in the up-and-down direction, so that the up-and-down position of the positioning pin 22 inserted in the long cylindrical portion 12 is adjusted.

Since the hole portion 12a of the long cylindrical portion 12 is a long hole extending in the side-to-side direction, the positioning pin 22 inserted in the long cylindrical portion 12 moves in the side-to-side direction as well, along with the side-to-side movement of the positioning pin 22 inserted in the cylindrical portion 11 of the seam adjusting mechanism 13. In other words, the positioning pin 22 inserted in the long cylindrical portion 12 of the seam adjusting mechanism 14 undergoes side-to-side position adjustment as well, along with the side-to-side position adjustment to the positioning pin 22 inserted in the cylindrical portion 11 of the seam adjusting mechanism 13.

The following describes how to fasten the LED display tiles 1a to 1r to the support structure 2, with reference to FIG. 3. How to fasten the LED display tile 1f to the support structure 2 will be described herein.

As shown in FIG. 3, a user first moves the pair of right and left movable portions 17 of the pull-out mechanism 51, disposed in the support structure 2, to the pull-out position, followed by hooking the pair of right and left metal hook plates 23, disposed on the back surface of the LED base 5, onto the pair of right and left elastic support portions 16 while making a visual or manual check. Here, the movable portions 17 support, via the elastic support portions 16, the LED display tile 1f that is located in the pull-out position.

The user then pushes one of the movable portions 17 forward, so that the pair of right and left movable portions 17 smoothly moves together due to the coupling portion 18, which couples the pair of right and left movable portions 17 to each other. The positioning pins 22 of the pair of right and left step adjusters 21, whose distal end portions are conical, are gradually guided toward the center axes of the cylindrical portion 11 and long cylindrical portion 12, thereby determining the up-and-down position and side-to-side position of the LED display tile 1f.

With the movable portions 17 located in the retraction position, the groove portions 30 of the metal retaining plates 24 (c.f., FIG. 4) are retained in the reception fittings 27, disposed on the housings at the corner joints 6, 7, 8, and 9, to establish the locking state, so that the lock mechanisms 54 control the back-and-forth movement of the LED display tile 1f. In other words, the back-and-forth position of the LED display tile 1f is determined. Here, with the LED display tile 1f located in the retraction position, the positioning pins 22 are inserted into the cylindrical portion 11 and the long cylindrical portion 12, so that the cylindrical portion 11 and the long cylindrical portion 12 support the LED display tile 1f while controlling the floated state of the LED display tile 1f in the side-to-side and up-and-down directions.

As shown in FIGS. 6 and 7, portions of the seam adjusting mechanisms 13 and 14 that abut on the step adjusters 21 are made of a magnetic material or magnet. To be more specific, the cylindrical portion 11 and the long cylindrical portion 12 are made of a magnetic material or magnet. Thus, with the movable portions 17 located in the retraction position, the magnetic force of the magnets 19 contained in the step adjusters 21 causes the step adjuster 21 and the cylindrical portion 11 to adhere to each other, and causes the step adjuster 21 and the long cylindrical portion 12 to adhere to each other.

The following describes how to adjust the up-and-down position and side-to-side position of the LED display tiles 1a to 1r, with reference to FIGS. 3, 6, and 7. How to adjust the up-and-down position and side-to-side position of the LED display tile 1f will be described herein by way of example.

As shown in FIG. 6, the up-and-down position adjuster 31 is screwed through the long hole 8b into the screw hole in the upper surface of the metal up-and-down movement plate 31a. The side-to-side position adjuster 32 is screwed through the long hole 8c into the screw hole in the right side surface of the metal side-to-side movement plate 32a. Here, since the long holes 8b and 8c are through-holes, the male screw portions of the up-and-down position adjuster 31 and the side-to-side position adjuster 32 are not screwed in the respective long holes 8b and 8c.

As shown in FIG. 7, the up-and-down position adjuster 31 is screwed through the long hole 9b into the screw hole in the upper surface of the metal up-and-down movement plate 31a. Here, since the long hole 9b is a through-hole, the male screw portion of the up-and-down position adjuster 31 is not screwed in the long hole 9b.

Reference is made to FIGS. 3, 6, and 7. Firstly, referring to the seam adjusting mechanism 13 at the corner joint 8, the user rotates the up-and-down position adjuster 31 of the up-and-down position adjusting mechanism 28 and the side-to-side position adjuster 32 of the side-to-side position adjusting mechanism 29, with the LED display tile 1f mounted to the support structure 2.

The metal up-and-down movement plate 31a and the metal side-to-side movement plate 32a respectively move in the up-and-down and side-to-side directions with reference to a surface of the housing 8a at the corner joint 8, so that the cylindrical portion 11 fastened to the metal up-and-down movement plate 31a moves in the up-and-down and side-to-side directions. This movement adjusts the up-and-down position and side-to-side position of the positioning pin 22 inserted in the cylindrical portion 11, and the side-to-side position of the positioning pin 22 inserted in the long cylindrical portion 12.

Subsequently, referring to the seam adjusting mechanism 14 at the corner joint 9, the user rotates the up-and-down position adjuster 31 of the up-and-down position adjusting mechanism 28. The metal up-and-down movement plate 31a moves in the up-and-down direction with reference to a surface of the housing 9a at the corner joint 9, so that the long cylindrical portion 12 fastened to the metal up-and-down movement plate 31a moves in the up-and-down direction. This movement adjusts the up-and-down position of the positioning pin 22 inserted in the long cylindrical portion 12.

As described above, making a side-to-side position adjustment in the seam adjusting mechanism 13, followed by making an up-and-down position adjustment in the seam adjusting mechanism 14 enables adjustment to the up-and-down position and side-to-side position of the positioning pin 22 inserted in the long cylindrical portion 12. Accordingly, the up-and-down position and side-to-side position of the entire LED display tile 1f, and the inclination of the entire LED display tile 1f with respect to a level are adjusted, whereby the gaps between one of the LED display tiles and other adjacent LED display tiles can be adjusted uniformly.

The following describes how to adjust the step between each of the LED display tiles 1a to 1r with respect to the support structure 2. The step adjustment is an adjustment in the back-and-forth direction. After the LED display tiles 1a to 1r are mounted to the support structure 2, this step adjustment is performed along with checking of the steps between the video display surface of one of the LED display tiles and the video display surfaces of the other adjacent LED display tiles. The video display surface of each LED display tile herein is the front surface of the LED display tile.

Figure 8:
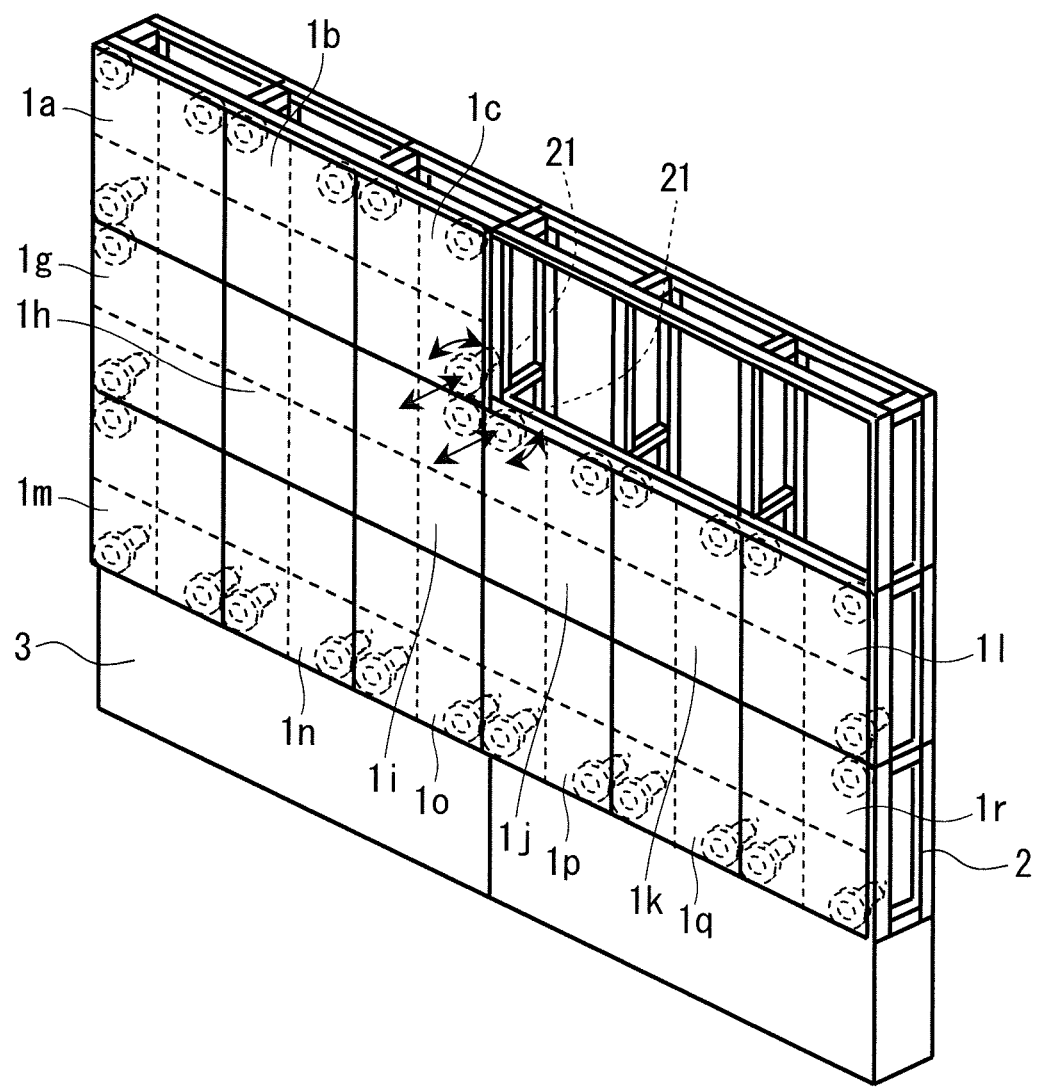
FIG. 8 is a diagram for describing how to adjust a step.

First, the following outlines how to adjust the step between each of the LED display tiles 1a to 1r with reference to FIG. 8. FIG. 8 is a diagram for describing how to adjust the step.

When mounting the LED display tiles 1a to 1f subsequently onto the support structure 2, the user checks the steps between the video display surface of one of the LED display tiles and the video display surfaces of the other adjacent the LED display tiles, followed by rotating the step adjusters 21 mounted on the back surface of each LED display tile. Each LED display tile accordingly moves in the back-and-forth direction, thereby adjusting the distance in the back-and-forth direction from the back surface of the LED base 5 to the front surfaces of the corner joints 6, 7, 8, and 9 (i.e., surfaces abutting on the step adjusters 21) of the support structure 2.

In other words, such a movement in the back-and-forth direction enables adjustment for eliminating the steps between the video display surface of one of the LED display tiles and the video display surfaces of the other adjacent LED display tiles. The front surfaces of the corner joints 6, 7, 8, and 9, which are surfaces abutting on the step adjusters 21, are the front end portions of the cylindrical portions 11 and long cylindrical portions 12.

In some cases, when the user makes a placement adjustment and performs maintenance, but can find no workable spaces behind the LED display tiles, the user needs to pull out the LED display tiles from a direction where the video display surfaces are located. The following describes how to release the fastening between the LED display tile 1a and the support structure 2 from the direction where the video display surface is located, with reference to FIGS. 9 and 10. FIG. 9 is a cross-sectional view showing the fastening between the LED display tile 1a and the support structure 2. FIG. 10 is a cross-sectional view showing that the fastening between the LED display tile 1a and the support structure 2 is released.

As described above, the lock mechanisms 54 each include the pair of upper and lower metal retaining plates 24, which are retaining portions, the pair of coupling wires 25, and the metal rotation plate 26. The lock mechanisms 54 each further include the attractive spring 35 and a pushing spring 36.

The metal retaining plate 24 is fastened to the back surface of the LED display tile 1a together with the attractive springs 35 and pushing springs 36. Each attractive spring 35 has one end fastened to the back surface of the LED display tile 1a, and the other end fastened to the metal retaining plate 24. The attractive spring 35 has a spring force for attracting the metal retaining plate 24 in a direction in which the metal retaining plate 24 is retained in the reception fitting 27. Thus, the metal retaining plate 24 is urged in the direction in which the metal retaining plate 24 is retained in the reception fitting 27.

Each pushing spring 36 has one end fastened to the back surface of the LED display tile 1a, and the other end being a free end. The pushing spring 36 has a spring force for pushing the LED display tile 1a forward, with the other end of the pushing spring 36 abutting on the front surface of the reception fitting 27 with the metal retaining plate 24 retained therein.

The metal retaining plate 24 is acted on a turning force under which the spring force of the attractive spring 35 causes the metal retaining plate 24 to turn in an arrow-C direction about the turn shaft 33. With the LED display tile 1a mounted to the support structure 2, the metal retaining plate 24 is caused to turn in the arrow-C direction about the turn shaft 33 by the spring force of the attractive spring 35, and remains still while bringing the coupling wire 25 under tension. Here, the arrow-C direction is the direction in which the metal retaining plate 24 is retained in the reception fitting 27.

The pair of metal retaining plates 24 is coupled to the metal rotation plate 26 via the coupling wires 25. Hence, as shown in FIG. 10, rotating, about the rotation shaft 34, the metal rotation plate 26 in an arrow-E direction in a plane parallel to the video display surface of the LED display tile 1a allows the pair of metal retaining plates 24 to rotate in an arrow-D direction via the coupling wires 25, thus releasing the locking state. Here, the plane parallel to the video display surface of the LED display tile 1a is the back surface of the LED display tile 1a.

FIG. 9 shows that the magnet jig 301 is located in a position remote from the video display surface of the LED display tile 1a, and that the metal retaining plate 24 is retained in the reception fitting 27, with the LED display tile 1a located in the retraction position. Accordingly, the magnetic force of the magnet jig 301 does not act on the metal rotation plate 26 to establish the locking state, so that the LED display tile 1a and the support structure 2 are fastened to each other.

FIG. 10 shows that the magnet jig 301 is disposed on the video display surface of the LED display tile 1a, at a location corresponding to the metal rotation plate 26 disposed on the back surface of the LED display tile 1a. The magnet jig 301 includes an antistatic-treated low-slidable resin protective layer 302, and a magnet layer 303 rotatable with respect to the low-slidable resin protective layer 302. It is noted that the magnetic force of the magnet layer 303 needs to have a capability of rotating the metal rotation plate 26, and that the magnet jig 301 may be located in a position where the magnet jig 301 abuts on the video display surface of the LED display tile 1a, or in a position adjacent to the video display surface of the LED display tile 1a.

The low-slidable resin protective layer 302 is brought into abutment with the location on the video display surface of the LED display tile 1a, the location corresponding to the metal rotation plate 26 on the back surface of the LED display tile 1a, and the magnet layer 303 is then rotated in the arrow-E direction in the plane parallel to the video display surface, with the metal rotation plate 26 caused to adhere by the magnetic force. The magnetic force causes the metal rotation plate 26, formed of a steel plate (i.e., a magnetic material), to rotate in the arrow-E direction in FIG. 10 about the rotation shaft 34 to bring the coupling wires 25 coupled to the metal rotation plate 26 under tension, whereby the metal retaining plate 24 turns in the arrow-D direction. Here, the arrow-D direction is a direction opposite from the direction in which the metal retaining plate 24 is retained in the reception fitting 27.

The turn of the metal retaining plate 24 detaches the groove portion 30 of the metal retaining plates 24 from the reception fittings 27, disposed on the housing of the corner joint 7, to release the locking state between the LED display tile 1a and the support structure 2, so that the fastening between the LED display tile 1a and the support structure 2 is released. Here, the pair of upper and lower metal retaining plates 24, which is coupled to the metal rotation plate 26 via the pair of coupling wires 25, is no longer retained in the pair of upper and lower reception fittings 27.

At this time, since the LED base 5, forming the back surface of the LED display tile 1a, is made of a nonmagnetic material, the LED base 5 is not affected by the magnetic force even when brought close to the magnet jig 301; only the metal rotation plate 26, which is formed of a steel plate (i.e., a magnetic material), is affected by the magnetic force.

Moving the magnet jig 301 away from the LED display tile 1a, or rotating the magnet layer 303 in an arrow-F direction with the magnet jig 301 adhering to the LED display tile 1a allows the metal rotation plate 26 to rotate in the arrow-F direction about the rotation shaft 34. The coupling wire 25 coupled to the metal rotation plate 26 becomes loose to allow the metal retaining plate 24 to turn in the arrow-C direction. The reception fitting 27 on the housing at the corner joint 7 is fitted into the groove portion 30 of the metal retaining plate 24, and is pushed toward the rear of the groove portion 30 of the metal retaining plate 24 by the spring force of the pushing spring 36. This establishes the locking state between the LED display tile 1a and the support structure 2. Here, the pair of upper and lower metal retaining plates 24, which is coupled to the metal rotation plate 26 via the pair of coupling wires 25, is retained in the pair of upper and lower reception fittings 27.

As shown in FIG. 9, with the LED display tile 1a fastened to the support structure 2, the magnet jig 301 is brought into abutment with a location on the video display surface of the LED display tile 1a, the location corresponding to the step adjuster 21 on the back surface of the LED display tile 1a, to thus adhere to the step adjuster 21 by the magnetic force. Rotating the magnet layer 303 in the plane parallel to the video display surface without directly rotating the step adjuster 21 enables the step adjuster 21 containing the magnet 19 (c.f., FIG. 4) to rotate by the magnetic force. This enables the distance in the back-and-forth direction from the back surface of the LED base 5 to the front surface of the corner joint 7 to be adjusted.

It is noted that the magnetic force of the magnet layer 303 needs to have a capability of rotating the metal rotation plate 21, and that the magnet jig 301 may be located in a position where the magnet jig 301 abuts on the video display surface of the LED display tile 1a, or in a position adjacent to the video display surface of the LED display tile 1a.

Referring to locations where the other LED display tiles adjacent to the LED display tile 1a are not pulled out, the position of the four corner portions of each LED display tile in the back-and-forth direction can be adjusted to eliminate the steps between the video display surface of the LED display tile 1a and the video display surfaces of the other adjacent LED display tiles.

Figure 11:
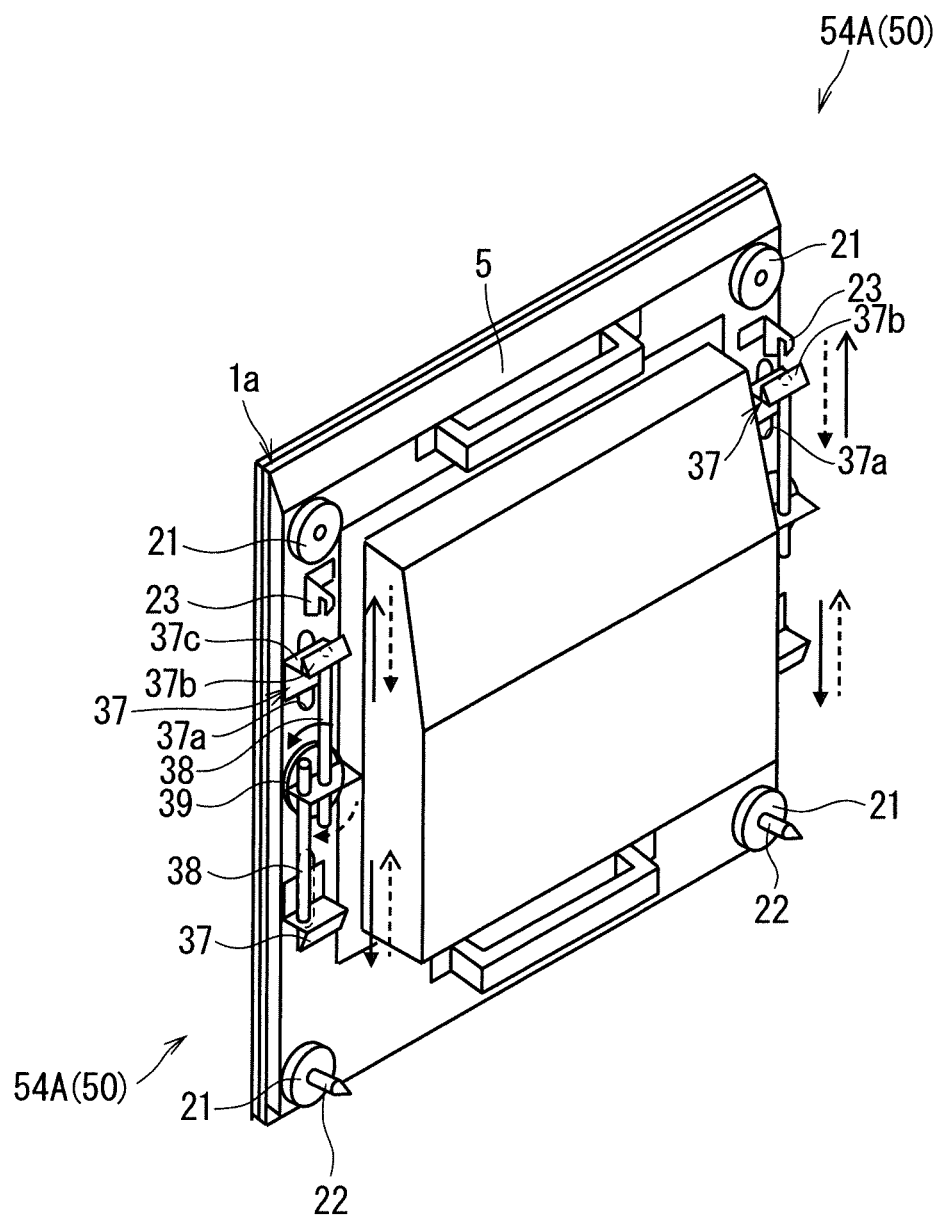
FIG. 11 is a perspective view of the back surface of an LED display tile according to a modification of the embodiment.

The following describes a modification of the embodiment. FIG. 11 is a perspective view of the back surface of the LED display tile 1a according to the modification of the embodiment.

As shown in FIG. 11, the LED display tile 1a in the modification of the embodiment is provided with pairs of upper and lower metal retaining plates 37 in place of the pairs of upper and lower metal retaining plates 24 shown in FIG. 4, coupling rods 38 in place of the coupling wires 25 shown in FIG. 4, and metal rotation plates 39 in place of the metal rotation plates 26 shown in FIG. 4.

The LED display tile 1a is provided with lock mechanisms 54A on its back surface, in place of the lock mechanisms 54. The lock mechanisms 54A each include the pair of upper and lower metal retaining plates 37, which are retaining portions, the pair of coupling rods 38, the metal rotation plate 39, and a wrapping spring (not shown).

The arrangement position of the pair of metal retaining plates 37, pair of coupling rods 38, and metal rotation plate 9, which is the same as the arrangement position of the pair of metal retaining plates 24, coupling wires 25, and metal rotation plate 26 shown in FIG. 4, will not be elaborated upon.

The LED base 5 has long holes 37a in its back surface, at locations where the pairs of metal retaining plates 37 are disposed. The long holes 37a extend in the up-and-down direction. Each of the pair of metal retaining plates 37 has a protruding portion (not shown) protruding forward from their front surfaces, and is mounted to the back surface of the LED base 5 with the protruding portion inserted in the long hole 37a. The pair of metal retaining plates 37 is thus slidable in the up-and-down direction along the long holes 37a. Each of the pair of metal retaining plates 37 has a groove 37c retainable to the reception fittings 27, and a slope portion 37b that abuts on the distal end portion of the reception fitting 27 to guide the distal end portion to the groove 37c.

Each of the pair of coupling rods 38 has one end coupled to the corresponding one of the pair of metal retaining plates 37. The metal rotation plate 39 is coupled to the other ends of the pair of coupling rods 38 and is rotatable about a rotation shaft (not shown). The wrapping spring is wrapped around the rotation shaft and has a spring force in a direction for returning the metal rotation plate 39 to its initial position.

The following describes how to release the fastening between the LED display tile 1a and the support structure 2 from a direction where the video display surface is located.

When the pull-out mechanism 51 is retracted, the distal ends of the reception fittings 27 at the corner joints 6, 7, 8, and 9 of the support structure 2 abut on the slope portions 37b of the metal retaining plates 37, and move along the slope portions 37b. Accordingly, the metal retaining plates 37 are pushed against the spring force of the wrapping spring to turn. Furthermore, when the distal end portions of the reception fittings 27 are fitted into the groove portions 37c, the metal retaining plates 37 and the reception fittings 27 are then retained by the spring force, thus bringing the lock mechanism 54A into the locking state.

As is the case with FIG. 3, with the magnet jig 301 brought into abutment with the video display surface of the LED display tile 1a, the metal rotation plate 39 is caused to rotate in a direction indicated by a dotted-line arrow shown in FIG. 11, by the magnetic force of the magnet jig 301. The pair of metal retaining plates 37 slides via the pair of coupling rods 38, in a direction opposite from a direction in which the pair of metal retaining plates 37 is retained in the pair of respective reception fittings 27, so that the locking state is released to release the fastening between the LED display tile 1a and the support structure 2.

Alternatively, the metal rotation plate 39 is caused to rotate in a direction indicated by a solid-line arrow shown in FIG. 11, by the magnetic force of the magnet jig 301. The pair of metal retaining plates 37 slides via the pair of coupling rods 38, in the direction in which the pair of metal retaining plates 37 is retained in the pair of respective reception fittings 27, to establish the locking state, so that the LED display tile 1a and the support structure 2 is fastened.

The foregoing configuration allows a user who performs installation and maintenance to easily release the fastening between the LED display tiles 1a to 1r and the support structure 2 from both a direction where the video display surfaces of the LED display tiles are located and a direction where their back surfaces are located, regardless of installation environment conditions around the back surfaces of the LED display tiles 1a to 1r. In addition, moving the magnet jig 301 away from the video display surface with the LED display tiles 1a to 1r pushed in, also enables the metal retaining plates 24 or metal retaining plates 37 to easily restore the retained state between the LED display tiles 1a to 1r and the support structure 2 by their spring force. Furthermore, the LED display tiles 1a to 1r require no maintenance spaces around their back surfaces, thereby achieving savings in space.

When a user releases the fastening between the LED display tiles 1a to 1r and the support structure 2 with the magnet jig 301, followed by pulling the magnet jig 301 slowly toward the user, the pull-out mechanism 51 enables the LED display tiles 1a to 1r to move toward the video display surfaces. Using the pull-out mechanism 51, the user can return the LED display tiles 1a to 1r to their positions before pull-out when returning these tiles from the pull-out position to the retraction position. The LED display tiles 1a to 1r are guided from the distal ends of the positioning pins 22 to the cylindrical portions 11 and long cylindrical portions 12 whose positions in the up-and-down, side-to-side, and back-and-forth directions have been adjusted, thus accurately returning to adjusted positions.

Although the embodiment has described the multi-display system 100 having 18 faces by way of example, an assembly adjustment similar to that performed in the multi-display system 100 can be made in a multi-display system having more LED display tiles as well. Even for a large multi-display system, a fine adjustment to the seams between the video display surfaces can be made through adjustment procedures similar to those described above. This achieves inconspicuous seams between the LED display tiles, thereby providing a seamless video image.

As described above, the multi-display system 100 according to the embodiment is configured such that when the lock mechanism 54 is in the locking state, each of the LED display tiles 1a to 1r is fastened in the retraction position, and that when the lock mechanism 54 is in the unlocking state, each of the LED display tiles 1a to 1 r is movable between the retraction position and the pull-out position by the pull-out mechanism 51 while being floated and supported via the elastic support portions 16.

Such a configuration allows a user to access the position adjusting mechanism 50, not only with each of the LED display tiles 1a to 1r located in the fastening position, but also with each of the LED display tiles 1a to 1r moved to the pull-out position by the pull-out mechanism 51. Consequently, the user can access the position adjusting mechanism 50 from both of the direction where the video display surfaces of the LED display tiles 1a to 1r are located and the direction where their back surfaces are located. Accordingly, even when there are no workable spaces behind the LED display tiles 1a to 1r, the user can make adjustments for providing inconspicuous seams between one of the LED display tiles and the other adjacent LED display tiles, from the direction where the video display surfaces are located.

The pull-out mechanism 51, which includes the guide portions 15 fastened to the support structure 2, the movable portions 17 movable along the guide portions 15, and the elastic support portions 16, can be achieved by a simple configuration.

With each of the LED display tiles 1a to 1r located in the pull-out position, the movable portions 17 float and support each of the LED display tiles 1a to 1r via the elastic support portions 16. In addition, with each of the LED display tiles 1a to 1r located in the pull-out position, the positioning pins 22 are inserted into the cylindrical portion 11 and the long cylindrical portion 12, so that the cylindrical portion 11 and the long cylindrical portion 12 support each of the LED display tiles 1a to 1r while controlling the floated state of each of these LED display tiles in the side-to-side and up-and-down directions. In addition, the metal retaining plates 24 are retained in the reception fittings 27, so that the lock mechanism 54 controls the movement of each of the LED display tiles 1a to 1r in the back-and-forth direction. Such a configuration enables the LED display tiles 1a to 1r to be accurately returned to their adjusted positions after these LED display tiles are pulled out, thus fastening the LED display tiles 1a to 1r and the support structure 2 to each other.

The pair of metal retaining plates 24 is retained in the pair of respective reception fittings 27, with the magnet jig 301 located in a position remote from the video display surface of each of the LED display tiles 1a to 1r and with each of the LED display tiles 1a to 1r located in the retraction position, so that each of the LED display tiles 1a to 1r and the support structure 2 are fastened to each other. In addition, the magnet jig 301 is located in a position adjacent to the video display surface of each of the LED display tiles 1a to 1r, and the metal rotation plate 26 is caused to rotate in one direction by the magnetic force of the magnet jig 301, so that the pair of metal retaining plates 24 turns via the pair of coupling wires 25, in a direction opposite from a direction in which the pair of metal retaining plates 24 is retained in the pair of respective reception fittings 27, to release the fastening between each of the LED display tiles 1a to 1 r and the support structure 2.

Such a configuration facilitates fastening between the LED display tiles 1a to 1 r and the support structure 2 and releasing of such fastening from the direction where the video display surfaces are located.

The lock mechanisms 54 each further includes the attractive spring 35 and the pushing spring 36. The pair of metal retaining plates 24 is fastened to the back surface of each of the LED display tiles 1a to 1r together with the attractive spring 35 and the pushing spring 36. The attractive spring 35 has a spring force for attracting the pair of metal retaining plates 24 in the direction in which the pair of metal retaining plates 24 is retained in the pair of respective reception fittings 27. The pushing spring 36 has a spring force for pushing each of the LED display tiles 1a to 1r forward with the pair of metal retaining plates 24 retained in the pair of respective reception fittings 27. Such a configuration facilitates bringing the lock mechanisms 54 into the locking state, thus fastening the LED display tiles 1a to 1r and the support structure 2 to each other.

In the modification of the embodiment, the pair of metal retaining plates 37 is retained in the pair of respective reception fittings 27, with the magnet jig 301 located in a position remote from the video display surface of each of the LED display tiles 1a to 1r and with each of the LED display tiles 1a to 1r located in the retraction position, so that each of the LED display tiles 1a to 1r and the support structure 2 are fastened to each other. In addition, the magnet jig 301 is located in a position adjacent to the video display surface of each of the LED display tiles 1a to 1r, and the metal rotation plate 39 is caused to rotate in one direction by the magnetic force of the magnet jig 301, so that the pair of metal retaining plates 37 slides via the pair of coupling rods 38, in a direction opposite from a direction in which the pair of metal retaining plates 37 are retained in the pair of respective reception fittings 27, to release the fastening between each of the LED display tiles 1a to 1r and the support structure 2.

Such a configuration facilitates fastening between the LED display tiles 1a to 1r and the support structure 2 and releasing of such fastening from the direction where the video display surfaces are located.

The lock mechanisms 54A each further include the wrapping spring wrapped around the rotation shaft. The wrapping spring has a spring force for rotating the metal rotation plate 39 in the direction in which the pair of metal retaining plates 37 is retained in the pair of respective reception fittings 27. With the pull-out mechanism 51 located in the retraction position, the wrapping spring causes the pair of metal retaining plates 37 to slide in the direction in which the pair of metal retaining plates 37 are retained in the pair of respective reception fittings 27.

Such a configuration facilitates bringing the lock mechanisms 54 into the locking state to fasten the LED display tiles 1a to 1r and the support structure 2 to each other.

The step adjusting mechanisms 53 each include the step adjuster 21 having a circular-plate shape, and the magnet 19 disposed inside the step adjuster 21. The positioning pin 22 is disposed on the center axis of the step adjuster 21 and protruding from the back surface of the step adjuster 21. A portion of each of the seam adjusting mechanisms 13 and 14 that abuts on the step adjuster 21 is made of a magnetic material or magnet. Accordingly, the step adjuster 21 and the portion of each of the seam adjusting mechanisms 13 and 14 that abuts on the step adjuster 21 are caused to adhere to each other by the magnet 19 contained in the step adjuster 21. This prevents detachment of the LED display tiles 1a to 1r from the support structure 2 during step adjustment.

While the invention has been shown and described in detail, the foregoing description is in all aspects illustrative and not restrictive. It is therefore understood that numerous modifications and variations can be devised without departing from the scope of the invention.

The embodiment of the present invention can be modified and omitted as appropriate, within the scope of the invention.

EXPLANATION OF REFERENCE SIGNS 1a to 1r, LED display tile, 2 support structure, 8a, 9a housing, 11 cylindrical portion, 11a hole portion, 12 long cylindrical portion, 12a hole portion, 13, 14 seam adjusting mechanism, 15 guide portion, 16 elastic support portion, 17 movable portion, 19 magnet, 21 step adjuster, 22 positioning pin, 24 metal retaining plate, 25 coupling wire, 26 metal rotation plate, 27 reception fitting, 33 turn shaft, 34 rotation shaft, 35 attractive spring, 36 pushing spring, 37 metal retaining plate, 38 coupling rod, 39 metal rotation plate, 50 position adjusting mechanism, 51 pull-out mechanism, 53 step adjusting mechanism, 54, 54A lock mechanism, 100 multi-display system, 301 magnet jig.

The invention claimed is:

1. A multi-display system comprising:
a plurality of video display devices;
a support structure that supports the plurality of video display devices;
a position adjusting mechanism disposed in the support structure and capable of adjusting a position of each of the plurality of video display devices; and
a pull-out mechanism disposed between the plurality of video display devices and the support structure, and capable of moving each of the plurality of video display devices between a retraction position and a pull-out position, the retraction position being a position for fastening each of the plurality of video display devices and the support structure to each other, the pull-out position being a position anterior to the retraction position,
wherein the position adjusting mechanism comprises a lock mechanism that switches between a locking state and an unlocking state, the locking state being a state for fastening each of the plurality of video display devices and the support structure to each other, the unlocking state being a state for releasing the fastening between each of the plurality of video display devices and the support structure,
when the lock mechanism is in the locking state, each of the plurality of video display devices is fastened in the retraction position, and when the lock mechanism is in the unlocking state, each of the plurality of video display devices is movable between the retraction position and the pull-out position by the pull-out mechanism while being floated and supported via an elastic support portion,
the position adjusting mechanism further comprises
a seam adjusting mechanism configured to adjust the position of each of the plurality of video display devices in side-to-side and up-and-down directions, and
a step adjusting mechanism configured to adjust the position of each of the video display devices in a back-and-forth direction,
the step adjusting mechanism comprises
a step adjuster on a back surface of each of the plurality of video display devices,
a magnet on the back surface of each of the plurality of video display devices, the magnet being disposed inside the step adjuster, and
a positioning pin on the back surface of each of the plurality of video display devices, the positioning pin being disposed on a center axis of the step adjuster and protruding backward from a back surface of the step adjuster,
the seam adjusting mechanism comprises
a housing fastened to the support structure, and
a cylindrical portion disposed at a front portion of the housing, the cylindrical portion supporting the positioning pin inserted in a hole portion, in a manner movable in the back-and-forth direction,
a portion of the seam adjusting mechanism that abuts on the step adjuster is made of a magnetic material or magnet, and
when each of the plurality of video display devices is in the retraction position, the positioning pin is inserted in the cylindrical portion, so that a magnetic force causes the step adjuster to adhere to the seam adjusting mechanism, which is disposed in the support structure.

2. The multi-display system according to claim 1, wherein the pull-out mechanism comprises
a guide portion fastened to the support structure,
a movable portion movable along the guide portion, and
the elastic support portion,
the support structure comprises at least one reception portion,
the lock mechanism comprises at least one retaining portion retainable to the at least one reception portion,
the movable portion floats and supports, via the elastic support portion, each of the plurality of video display devices located in the pull-out position,
with each of the plurality of video display devices located in the retraction position, the positioning pin is inserted into the cylindrical portion, so that the cylindrical portion supports each of the plurality of video display devices while controlling a floated state of each of the plurality of video display devices in the side-to-side and up-and-down directions, and
with each of the plurality of video display devices located in the retraction position, the at least one retaining portion is retained in the at least one reception portion, so that the lock mechanism controls a movement of each of the plurality of video display devices in the back-and-forth direction.

3. The multi-display system according to claim 2, wherein the multi-display system further comprises a magnet jig,
the at least one retaining portion comprises a pair of upper and lower metal retaining plates turnable about a turn shaft,
the at least one reception portion comprises a pair of upper and lower reception portions,
the lock mechanism further comprises
a pair of couplers each having one end coupled to corresponding one of the pair of metal retaining plates, and
a metal rotation plate coupled to other ends of the pair of couplers and rotatable about a rotation shaft,
the pair of metal retaining plates is configured to be urged in a direction in which the pair of metal retaining plates is retained in the pair of respective reception portions, and to turn, by a magnetic force of the magnet jig, in a direction opposite from the direction in which the pair of metal retaining plates is retained in the pair of respective reception portions,
with the magnet jig located in a position remote from a video display surface of each of the plurality of video display devices, and with each of the plurality of video display devices located in the retraction position, the pair of metal retaining plates is retained in the pair of respective reception portions, so that each of the plurality of video display devices and the support structure are fastened to each other, and
the magnet jig is located in a position adjacent to the video display surface of each of the plurality of video display devices, and the metal rotation plate is caused to rotate in one direction by the magnetic force of the magnet jig, so that the pair of metal retaining plates turns via the pair of couplers, in a direction opposite from a direction in which the pair of metal retaining plates is retained in the pair of respective reception portions, to release the fastening between each of the plurality of video display devices and the support structure.

4. The multi-display system according to claim 3, wherein the lock mechanism further comprises an attractive spring and a pushing spring, the pair of metal retaining plates is fastened to the back surface of each of the plurality of video display devices together with the attractive spring and the pushing spring, the attractive spring has a spring force for attracting the pair of metal retaining plates in the direction in which the pair of metal retaining plates is retained in the pair of respective retaining portions, and the pushing spring has a spring force for pushing each of the plurality of video display devices forward with the pair of metal retaining plates retained in the pair of respective retaining portions.

5. The multi-display system according to claim 2, wherein the multi-display system further comprises a magnet jig, the at least one retaining portion comprises a pair of upper and lower metal retaining plates slidable in the up-and-down direction, the at least one reception portion comprises a pair of upper and lower reception portions, the lock mechanism further comprises
 a pair of couplers each having one end coupled to corresponding one of the pair of metal retaining plates, and
 a metal rotation plate coupled to other ends of the pair of couplers and rotatable about a rotation shaft, with the magnet jig located in a position remote from a video display surface of each of the plurality of video display devices, and with each of the plurality of video display devices located in the retraction position, the pair of metal retaining plates is retained in the pair of respective reception portions, so that each of the plurality of video display devices and the support structure are fastened to each other, and the magnet jig is located in a position adjacent to the video display surface of each of the plurality of video display devices, and the metal rotation plate is caused to rotate in one direction by a magnetic force of the magnet jig, so that the pair of metal retaining plates slides via the pair of couplers, in a direction opposite from a direction in which the pair of metal retaining plates is retained in the pair of respective reception portions, to release the fastening between each of the plurality of video display devices and the support structure.

6. The multi-display system according to claim 5, wherein the lock mechanism further comprises a wrapping spring wrapped around the rotation shaft, the wrapping spring has a spring force for rotating the metal rotation plate in the direction in which the pair of metal retaining plates is retained in the pair of respective reception portions, and with the pull-out mechanism located in the retraction position, the wrapping spring causes the pair of metal retaining plates to slide in the direction in which the pair of metal retaining plates is retained in the pair of respective reception portions.

7. A video display device included in the multi-display system according to claim 1.

8. A pull-out mechanism included in the multi-display system according to claim 1.

* * * * *